D. Y. HALLOCK.
SLED.
APPLICATION FILED APR. 8, 1913.
1,090,052.
Patented Mar. 10, 1914.
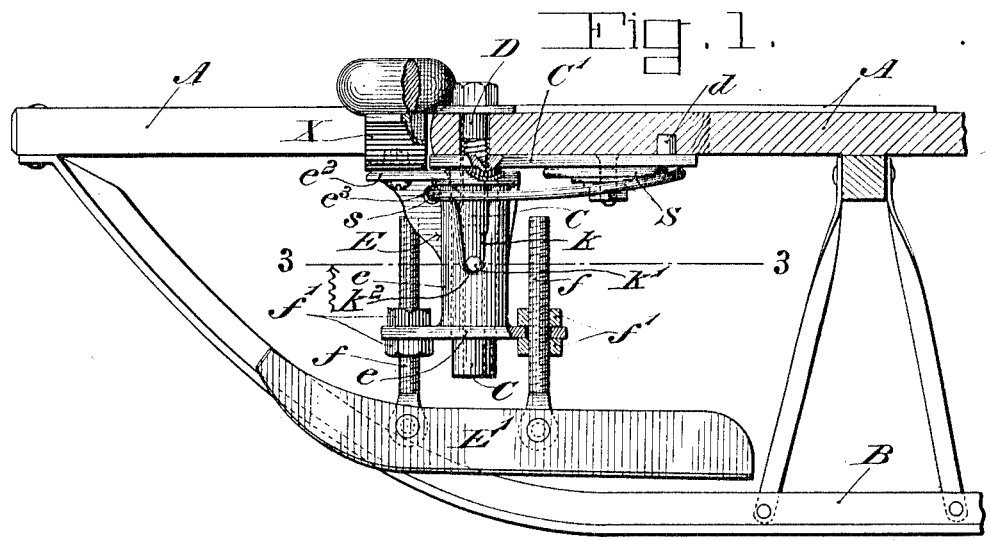
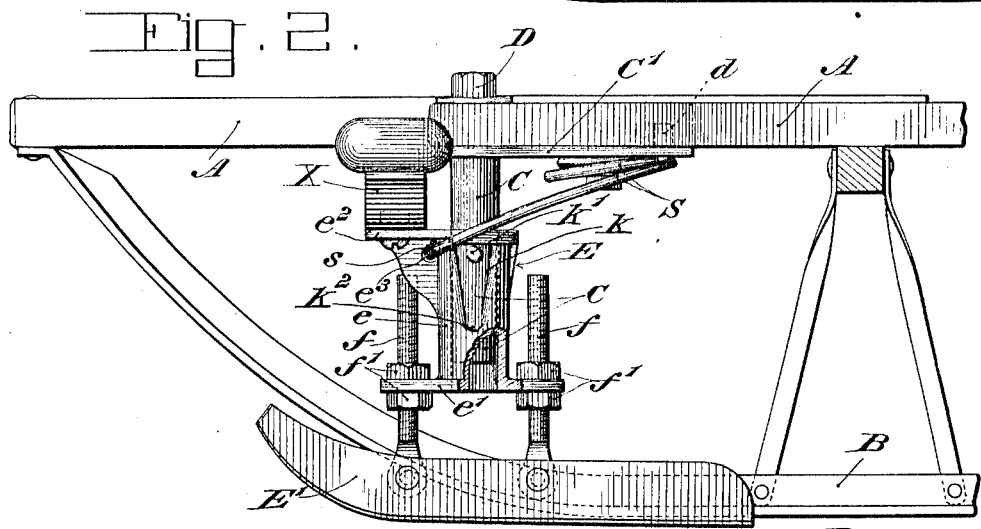
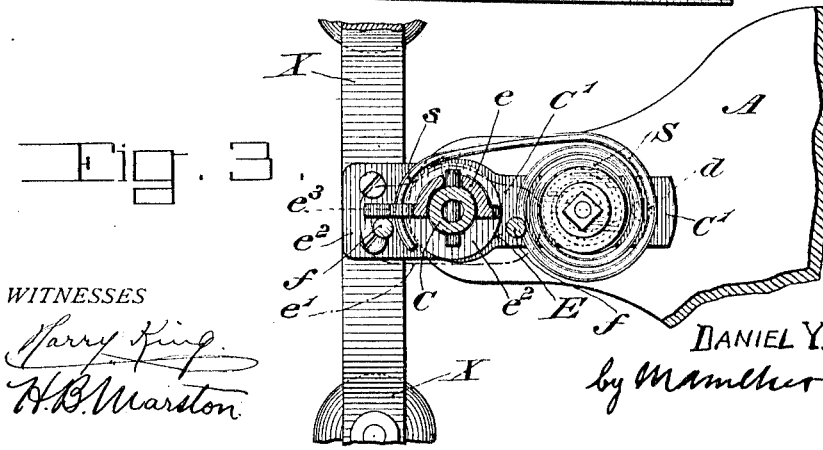
WITNESSES
INVENTOR
DANIEL Y. HALLOCK

UNITED STATES PATENT OFFICE.

DANIEL Y. HALLOCK, OF YORK, PENNSYLVANIA.

SLED.

1,090,052.

Specification of Letters Patent.

Patented Mar. 10, 1914.

Application filed April 8, 1913. Serial No. 759,625.

*To all whom it may concern:*

Be it known that I, DANIEL Y. HALLOCK, of the city and county of York, in the State of Pennsylvania, have invented certain new and useful Improvements in Sleds, of which the following is a specification.

My invention relates to sled steering devices.

The sled steering device which embodies my invention is one in which a steering blade is loosely mounted upon a vertical post or spindle secured to, and depending from the under side of, the top of the sled between the runners, said steering blade being adapted to swivel on said post and also to move up and down upon the same, being normally upheld by a spring above the level of the sled runners, and being depressible against the stress of the spring to contact with the surface over which the sled travels, whenever it is desired to use it for steering purposes.

A further feature of my improvements consists in combining with the swiveled and depressible steering blade, means to limit the depression as well as the lateral motion of the steering blade, and also to lock it centrally against swiveling movement when in elevated position, thus preventing it from being accidentally deflected by obstructions which may be in the path of the sled.

I prefer to make the device as an attachment which can be sold separately from the sled, and can easily be applied to any known form of hand sled. And as different makes of sleds vary in the height at which their top is above the ground, I make the steering blade adjustable in height so as to conform to the height of the particular sled to which it may be applied.

To enable those skilled in the art to make and use my invention, I will proceed to describe more particularly the manner in which the same is, or may be, carried into effect by reference to the accompanying drawings in which—

Figure 1 is a side elevation, partly in section, of the front portion of a sled embodying my invention, with the steering blade in elevated position. Fig. 2 is a like view with the steering blade depressed. Fig. 3 is a section on line 3—3 Fig. 1.

A is the top and B are the runners of a sled of any suitable or approved pattern. Secured to, and depending from the under side of, the sled top between the runners is a vertical cylindrical spindle C. This spindle may be applied and secured to the sled in the position shown in any suitable way. In the present instance, it is cast in one with a flat elbow plate C', which fits up snugly against the under face of the sled top A, or an extension thereof, and is held in place by a screw bolt D, which is screwed down from above the sled top into a screw threaded hole tapped for its reception in the plate C' and upper end of the spindle C, Figs. 1 and 2. To further secure the device in position, a stud or steady pin $d$ may be provided, projecting up from the face of the plate C' into a socket formed for its reception in the top.

E is the base portion of the steering blade, mounted to swivel and also move up and down on the spindle C. For this purpose it is formed in the present instance as a malleable casting having central sleeve $e$ which fits, and can move up and down on, the spindle as well as turn or swivel thereon, at the lower end of which is a horizontal plate $e'$ extending fore and aft of the sleeve, to which plate the steering blade proper is attached. At the top of this casting is a flat head plate $e^2$ forming a seat to which is secured the handle X by which the steering blade is manipulated.

The spring lifting device consists, in the present instance, of wire coiled in the form of a flat helical coil S fitting against and secured at one end to the under face of the elbow plate C', and having its free end extended as at $s$ to engage some suitable portion of the base E so as to exercise a lifting action thereon, for which purpose, in the present instance, the bent front end of the spring passes through a hole $e^3$ in the base E. By putting the spring into the form of a helical coil which is placed as nearly as possible to the under face of the top of the sled, the spring is safely housed and protected against the clogging effect of snow or ice.

E' is the steering blade proper. It can be made integral with the part E if desired; but for reasons hereinbefore indicated, I prefer to make the two parts separate, and to so arrange things that the blade can be adjusted vertically on the part E and be secured tightly thereon in its adjusted position. For this purpose I can conveniently employ, as I do in the present instance, vertical screw threaded stems $f$, two in number, secured rigidly at their lower ends to the steering blade E', and passing up loosely through holes in the plate $e'$. On each stem are two adjusting and locking nuts $f'$, one above and one below the plate $e'$, by means of which the steering blade obviously can be adjusted to the height of the sled to which the attachment may be applied, and secured rigidly in that position.

Any suitable means for depressing the steering blade, and also for turning the same, may be employed. In the present instance I make use of a single handle for both purposes—a cross bar handle X secured to the head $e^2$ of the base plate E, as shown. But if preferred a separate handle can be used for each purpose, as described and claimed in my application, Ser. No. 719,082, filed September 7, 1912.

It is particularly desirable to prevent an uncontrolled swinging of the handle and steering blade; also to limit the extent to which the steering blade can be depressed, and to lock it rigidly against swiveling motion when not depressed for steering. For this purpose I form in the side of the sleeve $e$ a vertical tapering slot $k$ into which projects a pin $k'$ fixed to the spindle C. The slot at the top is of a width to allow the steering blade the requisite range of swiveling motion. Its sides thence converge as they extend downward, until at the bottom of the slot, they approach one another near enough to form the locking notch $k^2$, which the pin $k'$ enters when the base plate E is in elevated position, thus locking said plate against swiveling motion. The length of the slot $k$ determines the extent to which the steering blade can be depressed, and the width of the slot at its upper end determines the extent of the swiveling motion of said blade for steering purposes.

Having described my improvements and the manner in which the same are, or may be, carried into practical effect, I state in conclusion that I do not limit myself strictly to the structural details hereinbefore shown and set forth in illustration of my invention, since manifestly the same can be varied considerably without departing from the spirit of the invention; but

What I claim herein as new and desire to secure by Letters Patent, is as follows:

1. The combination with a sled comprising the usual body and runners, of a spindle secured rigidly to the under side of the sled top and extending down vertically therefrom between the sled runners; a sleeve also located below the sled top mounted on said spindle to both swivel and move up and down thereon; a steering blade carried by and moving with the sleeve; a spring to retain the sleeve in uplifted position; and manually operated means for depressing the sleeve against the stress of the spring and for turning it on the spindle as an axis, substantially as and for the purposes hereinbefore set forth.

2. The combination with a sled comprising the usual body and runners, of a vertical spindle rigidly secured to, and depending from, the under side of the sled body between the runners, a steering blade loosely mounted on said spindle, and adapted both to swivel and to move up and down thereon, a spring to retain the steering blade in uplifted position, manually operated means for depressing the blade against the stress of the spring and for turning it upon the spindle as an axis, and means whereby the steering blade in uplifted position is automatically locked against swiveling movement, substantially as and for the purposes hereinbefore set forth.

3. The combination with a sled comprising the usual body and runners, of a vertical spindle rigidly secured to, and depending from, the under side of the sled body between the runners; a steering blade loosely mounted on said spindle, and adapted both to swivel and to move up and down thereon; a spring to retain the steering blade in uplifted position; manually operated means for depressing the blade against the stress of the spring and for turning it upon the spindle as an axis; means whereby the steering blade in uplifted position is automatically locked against swiveling movement; and means for limiting the extent of swiveling movement of the steering blade when depressed, substantially as and for the purposes hereinbefore set forth.

4. The combination with a sled comprising the usual body and runners, of a vertical spindle rigidly secured to the under side of the sled top, and extending down therefrom between the sled runners; a sleeve, also located below the sled top, mounted on said spindle to both swivel and move up and down thereon, said sleeve formed with a vertical V-shaped slot, the sides of which converge downwardly; a pin on the spindle laterally projecting therefrom into, and engaging, said slot, the length of the slot determining the extent to which the sleeve can be depressed, and the width of the slot as it gradually widens toward its upper end determining the extent of the swiveling motion of the sleeve when depressed; a steering blade carried by and moving with the sleeve; a spring to retain the sleeve in uplifted position; and manually operated means for depressing the sleeve against the stress of the spring and for turning it upon the spindle as an axis, substantially as and for the purposes hereinbefore set forth.

5. In a sled steering device, a spindle adapted to be secured to, and to depend from, the body of the sled between the runners, in combination with a base plate mounted on said spindle, and adapted to swivel and to move up and down thereon, a steering blade-proper adjustable vertically upon said base plate, and means for securing said plate and blade together in adjusted position, substantially as and for the purposes hereinbefore set forth.

In testimony whereof I affix my signature in presence of two witnesses.

DANIEL Y. HALLOCK.

Witnesses:
CHARLES CAMERON,
HENRY W. EISENHART.

Copies of this patent may be obtained for five cents each, by addressing the "Commissioner of Patents, Washington, D. C."